Aug. 13, 1968 G. W. BOWERS ETAL 3,396,811

REMOTE CONTROL FOR AUTOMOBILES

Filed Oct. 13, 1965

INVENTORS:
GROVER W. BOWERS,
FRANCIS H. KENNEDY,

BY Kingsland, Rogers, Ezell & Robbins
ATTORNEYS

United States Patent Office 3,396,811
Patented Aug. 13, 1968

3,396,811
REMOTE CONTROL FOR AUTOMOBILES
Grover W. Bowers, 1724 McCready Ave., and Francis H. Kennedy, 22 Berkshire, both of Richmond Heights, Mo. 63117
Filed Oct. 13, 1965, Ser. No. 500,484
2 Claims. (Cl. 180—98)

ABSTRACT OF THE DISCLOSURE

A device for stopping or warning an automobile and the like including, as a compact unit for installation on a car, a radio receiver, a transformer, a voltage doubler and the like, a transistor, a time delay relay, a connection from the relay to ground and to the condenser of a car, a buzzer, and electrically interconnecting wiring.

---

The present invention relates generally to controls, and more particularly to a device for stopping or warning an automobile, or other motorized unit, by remote control.

For years there has been a demand for a practical device by which police officers can stop or warn a speeding car by remote control, or an ambulance can warn a closed car of its approach. It is extremely dangerous for police to chase a car at high speeds through traffic and populous areas. Many serious accidents have occurred resulting in great loss of life and property.

The present device is a solution to the long existing problem. In brief, a radio receiver is installed in each private car or other motorized unit which is connected through the present device into the condenser or spark coil of the car. In the police car, ambulance, or other remote control center, is a transmitter which is tuned to a predetermined frequency. The continuous transmission of the selected frequency to the receiver of the private car or other unit will stop the motor thereof through disabling of the condenser or spark coil. An intermittent transmission thereof will warn the private car or other unit.

Therefore, an object of the present invention is to provide a novel device for stopping or warning a motorized private car, or other motorized unit, by remote control.

Another object is to provide a novel device for stopping or warning a motorized private car, or other motorized unit, by remote control, which can be installed as original or later equipment.

Another object is to provide a novel device for stopping or warning a motorized private car, or other motorized unit, by remote control, which is simple in construction and inexpensive.

Another object is to provide a novel device for stopping or warning a motorized private car, or other motorized unit, by remote control, which can be readily employed in an area by law enforcement officers to substantially eliminate high speed chases.

Another object is to provide a novel device for stopping or warning a motorized private car, or other motorized unit, by remote control, which requires substantially no skill to operate once installed.

Another object is to provide remote controlled means for warning traffic within a predetermined area that an emergency vehicle, as an ambulance, is approaching.

Another object is to provide a remote controlled warning and control means for controlling and warning automobiles, motor boats, and other motorized units within a predetermined area.

Another object is to provide means for assisting radar speed control to automatically stop vehicles exceeding predetermined speed limits.

Another object is to provide means for stopping speeding cars operable from patrolling aircraft.

Figure 1:
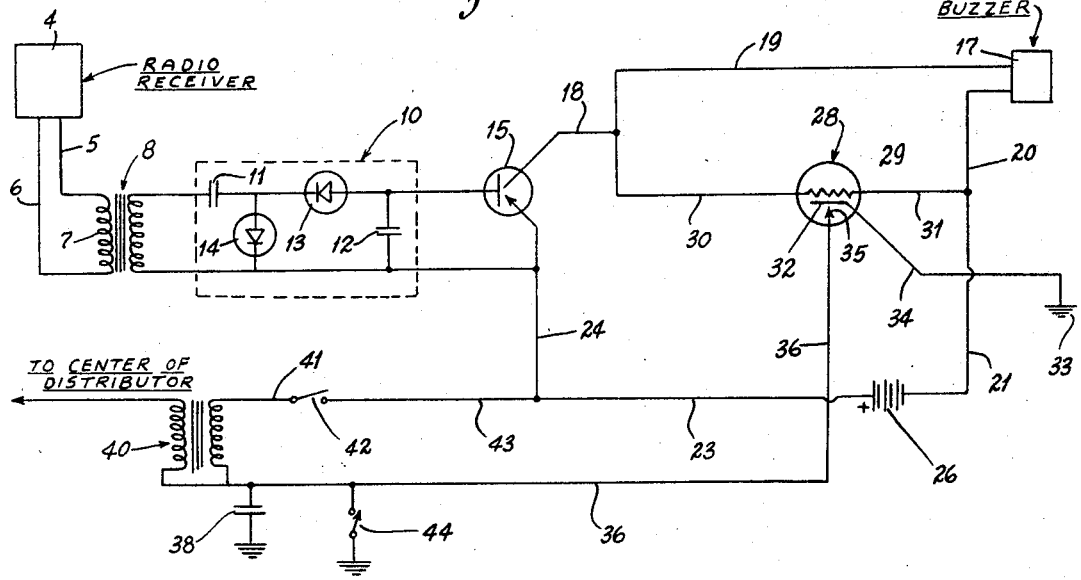
Figure 2:
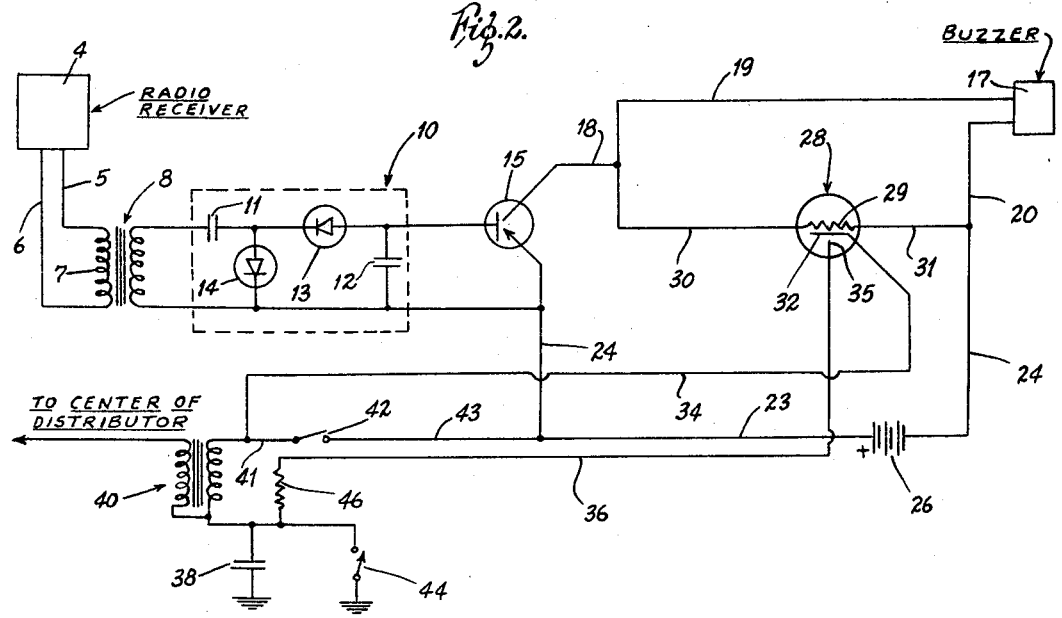

The foregoing and other objects and advantages are apparent from the following description taken with the accompanying drawing, in which:

FIGURE 1 is a diagrammatic view of an embodiment of the invention operatively connected to ground the distributor condenser of a car; and FIGURE 2 is a diagrammatic view thereof operatively connected to shunt the spark coil of a car.

Referring to the drawing by reference numerals and particularly considering FIGURE 1, a radio receiver 4 is illustrated as connected by leads 5 and 6 to the primary 7 of a step-up transformer 8, which, for example, may step up one microvolt to twenty microvolts. Only enough current is necessary to trigger a power transistor 15, more particularly mentioned below. Connected to the secondary 9 of the transformer 8 by suitable leads, as indicated, is a voltage doubler 10 comprising filler condensers 11 and 12, which may be of forty microfarads capacity, and germanium diodes 13 and 14 which build up a voltage sufficient to trigger the power transistor 15. This build-up may be one to two volts, two to four volts, etc., as desired. A buzzer or light 17 is connected into the circuit of the voltage doubler 10 an the transistor 15 by leads 18, 19, 20, 21, 23 and 24, the leads 21 and 23 being connected to the car battery 26. A normally open adjustable time delay relay 28 has its heater unit 29 connected in parallel with the buzzer or light 17 by leads 30 and 31. The movable blade 32 of the relay 28 is connected to ground 33 by lead 34, and the fixed contact 35 thereof is connected by lead 36 to the distributor condenser 38 and the spark coil 40 of the car, as shown. The spark coil 40 of the car is connected by lead 41 to the car switch 42 which is connected to the battery 26 by a lead 43 and the lead 23. The car distributor points 44 are connected into the lead 36 and to ground.

From the foregoing, it is clear that upon a predetermined continuous signal from a transmitter being received by the receiver 4 mounted in a car, or other motorized unit, as from the transmitter of a pursuing police car, or a ground or air radar installation, the step-up transformer 8 functions to multiply the voltage which is fed into the doubler 10. Sufficient voltage is developed to close the normally open transistor 15, thereby permitting current to flow through the buzzer 17 and the heater unit 29 of the time delay relay 28. The buzzer 17 is immediately energized to sound a continuous signal to warn the motorist that his engine will be automatically turned off in a predetermined time interval, as thirty seconds. In thirty seconds, the heater unit 29 effects movement of the blade 32 into engagement with the contact 35, thereby establishing a circuit which grounds the distributor condenser 38, thereby deenergizing the electrical system of the car and stopping its engine. The car thereupon must roll to a stop, thereby eliminating high speed police chases. The thirty second delay period may be varied, as desired, but should be long enough to permit the driver to stop after the warning.

The present device can be employed to warn the motorist of an approaching emergency vehicle, as an ambulance, police car, or the like. With windows closed in hot, cold or inclement weather, it is often impossible to see or hear an approaching emergency vehicle. An intermittent signal from the emergency vehicle can be employed to intermittently actuate the buzzer 17 without heating the heater unit 29 to a point causing closing of the blade 32 with the contact 35.

In FIGURE 2, an embodiment of the present invention is illustrated in which energization effects shunting of the spark coil of the motor of a car, or other motor. For like parts, the same reference numerals are employed as are used in FIGURE 1. A resistor 46 is disposed in lead 36 adjacent the spark coil 40.

In operation, when the blade 32 closes with contact 35 upon a continuous signal being received by the receiver 4, the established circuit through lead 36 shunts the spark coil 40, thereby deenergizing or decreasing the effectiveness of the car's electrical system, as desired, and causing the motor thereof to stop or slow down. As with the embodiment of FIGURE 1, an intermittent signal will actuate intermittently only the buzzer or light 17 to warn the occupant of the car, or the like, of an approaching ambulance, cruising police car, or other signal source.

The present device including the receiver 4 is quite compact, one embodiment being some 4" x 4" x 2". There is no interference with the normal functioning of the car on which the device is installed. An experimental installation has demonstrated the high effectiveness of the invention.

It is apparent that there has been provided a novel device of the kind disclosed which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a device for selectively deenergizing and rendering less effective the electrical system of a motor, as of a car, comprising means for receiving signals of a predetermined frequency propagated by a transmitter, and means for using said received signal to render selectively ineffective and less effective the electrical system of a car on which said device is installed including means for increasing the voltage of the received signal including a doubler, a transistor effective upon predetermined voltage, a normally inactive circuit connectible to the condenser of a car, and means to energize said circuit including a relay energized by the voltage originated by said signal.

2. In combination, a device for deenergizing the electrical system of a motor including an electrical system having a distributor condenser and the like comprising means for receiving signals of a predetermined frequency propagated by a transmitter, means for increasing the voltage of the received signal a predetermined degree including a voltage doubler and the like, a transistor energizable from the increased voltage, a time delay relay in circuit with said transistor, and a normally inactive electrical circuit including the motor distributor condenser to ground and said relay, said relay having means for energizing said circuit to ground the condenser and deenergize the motor electrical system upon receipt of a signal by said receiver and voltage build-up.

References Cited
UNITED STATES PATENTS

| | | | |
|---|---|---|---|
| 1,808,022 | 6/1931 | Del Prete | 180—82 |
| 2,025,106 | 12/1935 | Hirshfield | 340—32 |
| 2,831,546 | 5/1958 | Henderson | 180—82.1 |
| 2,973,432 | 2/1961 | Hill | 321—15 X |
| 3,154,168 | 10/1964 | Wilmot | 180—82 |
| 3,194,970 | 7/1965 | Claps | 307—10 |
| 3,203,501 | 8/1965 | Carter et al. | 180—82.1 |

KENNETH H. BETTS, *Primary Examiner.*